Patented Mar. 26, 1935

1,995,402

UNITED STATES PATENT OFFICE 1,995,402

PREPARATION OF ARYL-KETONES AND PHENOL ESTERS

Siegfried Skraup, Wurzburg, Germany, assignor to Rheinische Kampfer-Fabrik G. m. b. H., Dusseldorf-Oberkassel, Germany No Drawing. Application March 7, 1932, Serial No. 597,422. In Germany March 14, 1931

8 Claims. (Cl. 260—64)

My invention relates to the condensation reaction between organic acids or acid anhydrides with aromatic compounds.

It is an object of my invention to provide means whereby such reactions can be carried through in a more efficient and favorable way than was hitherto possible.

I have discovered that it is possible to effect condensation of organic acids or acid anhydrides with aromatic compounds by heating the two components in the presence of a surface catalyst.

I have found that of the surface catalysts known in the art the following are particularly adapted for the purpose in view, viz. the hydrosilicates of alumina available on the market under various trade names, such as "fuller's earth", "Tonsil", "Floridine", "Franconite" etc. (see O. Kausch, Das Kieselsäuregel und die Bleicherden, Berlin 1927), active carbon, silica gel and other highly porous substances.

According to the aromatic compound with which the acid or acid anhydride shall be condensed, condensation products of different character are obtained. Thus hydrocarbons are converted into aryl ketones, amines into amino ketones, phenols, if condensed with acids, are converted into phenol esters and oxy-ketones, if condensed with phthalic anhydride, into phenolphthaleines, while condensation with cinnamic acid results in the formation of phenyl-oxy-phenyl-propionic acid and phenyl-dihydrocumarines.

The new process involves the particular advantage that in the place of the acid chlorides hitherto used in effecting condensations of this character, I may use the free acids themselves. Similarly, the surface catalysts now used offer great advantages as compared with the condensation agents hitherto used (strong mineral acids, metal halides), inasmuch as they do not attack the reaction vessels.

In carrying the condensation reactions according to this invention into practice, I heat the components in the presence of a surface catalyst under the reflux condenser or in an autoclave to 100–350° C., preferably under stirring.

In practicing my invention I may for instance proceed as follows:—

Example 1

20 parts by weight naphthalene are heated to boiling during 4 hours in the presence of 12 parts benzoic acid and 5 parts Tonsil. After steam has been blown through the reaction mixture there remain over 6 parts β-naphthyl phenyl ketone melting at 82° C. The product is constituted according to the formula

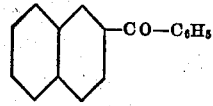

Example 2

When heating 20 parts anisic acid with 50 parts o-cresol and 7 parts Tonsil under stirring during 3 hours to 185–200° C., there are formed besides 66% of the calculated quantity of anisic acid-o-cresol ester

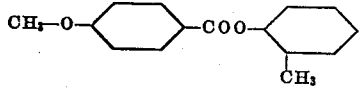

(boiling at 216° under 15 mms. mercury column and melting at 73° C.), 30% p-anisoyl-o-cresol $$CH_3-O-\bigcirc-CO-\bigcirc(CH_3)-OH$$

having the form of white crystals melting at 143° C.

Example 3

10 parts o-cresol are heated with 3 parts benzoic acid and one part Tonsil during 3 hours under stirring to 185–200° C. There result 73% of the calculated quantity benzoic acid-o-cresol ester

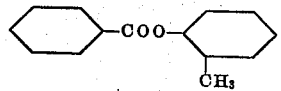

and 20% p-benzoyl-o-cresol

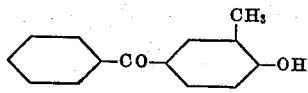

melting at 172° C.

Similar results are obtained if Tonsil is replaced by silica gel or carbo animalis.

Example 4

20 parts salicylic acid are heated 4 hours to 180° C. with 50 parts phenol and 7 parts Floridine. There results a quantity of salicylic acid phenyl ester

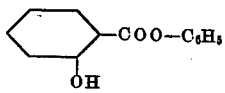

corresponding to 77% of the salicylic acid entering into the reaction.

Example 5

30 parts naphthenic acid boiling, under 12 mms. mercury column, at 150–175° C., are heated during 3 hours to about 200° C. with 40 parts crude tar phenols (boiling at 95–105° C. under 12 mms. mercury column) and 5 parts Tonsil. There results a quantity of phenol esters corresponding to 95% of the calculated quantity.

When using Franconite F. C., 90%, when using silica gel, 20% of the acid are converted into crude tar phenol ester.

The product is a readily moving colourless liquid of weak smell boiling at 190–220° C. under 12 mms. mercury column.

Example 6

If 3 parts benzoic acid are heated during 2½ hours under stirring to 230–250° C. with 8 parts α-naphthol and 1 part Tonsil, there are formed 3½ parts, equivalent to 80% of the reacted benzoic acid, 1-hydroxy-2-benzoyl naphthalene

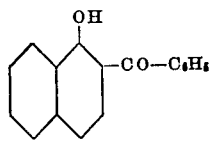

having the form of yellow crystals melting at 65° C.

Example 7

If 2 parts phthalic anhydride are heated in 10 parts phenol in the presence of one part Franconite F. C., there are obtained 2 parts phenolphthalein

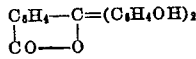

of high purity.

Example 8

If cinnamic acid is heated to boiling in an excess of phenol in the presence of 15% Tonsil, a quantity of β-phenyl - β - (4 - hydroxy - phenyl) - propionic acid

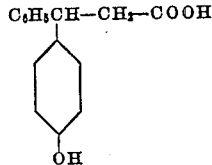

equivalent to the weight of the acid, and ⅓ of this weight phenyl dihydro cumarine are formed.

Example 9

10 parts α-naphthylamine are heated 5 hours with 5 parts benzoic acid and 1.5 parts Tonsil to 200–220° C. There are obtained 80% of the well known benzoic acid-α-naphthylamine

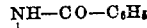

melting at 160° C., which, owing to being difficultly soluble in ether, can be separated from the reaction product. There are further formed 19% 1-amino-naphthyl-phenyl ketone

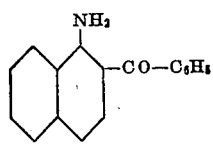

which can be separated from naphthylamine in excess by means of a dilute acid, for instance tartric acid, in which, owing to its low viscosity, it is not soluble. The amino ketone on being recrystallized from alcohol forms white crystals melting at 86° C.

When heating to high temperatures, the reaction is carried through in the autoclave, i. e. under increased pressure.

Various changes may be made in the details disclosed in the foregoing specification without departing from the invention or sacrificing the advantages thereof.

I claim:—

1. The method of carrying out condensation reactions comprising acting at 100–350° C. with a compound selected from the group consisting of carboxylic acids and carboxylic acid anhydrides on an aromatic compound in the presence of a hydrosilicate of alumina acting as catalyst.

2. The method of carrying out condensation reactions comprising acting at 100–350° C. under pressure with a compound selected from the group consisting of carboxylic acids and carboxylic acid anhydrides on an aromatic compound in the presence of a hydrosilicate of alumina acting as catalyst.

3. The method of producing phenol esters and oxy-ketones comprising heating a carboxylic acid with a phenol to 100–350° C. in the presence of a hydrosilicate of alumina acting as catalyst.

4. The method of producing aryl-ketones comprising heating a carboxylic acid with an aromatic hydrocarbon to 100–350° C. in the presence of a hydrosilicate of alumina acting as catalyst.

5. The method of producing amino-ketones comprising heating a carboxylic acid with an aromatic amine to 100–350° C. in the presence of a hydrosilicate of alumina acting as catalyst.

6. The method of producing phenol esters and oxy-ketones comprising heating a carboxylic acid with a phenol to 100–350° C. under pressure in the presence of a hydrosilicate of alumina acting as catalyst.

7. The method of producing aryl-ketones comprising heating a carboxylic acid with an aromatic hydrocarbon to 100–350° C. under pressure in the presence of a hydrosilicate of alumina acting as catalyst.

8. The method of producing amino-ketones comprising heating a carboxylic acid with an aromatic amine to 100–350° C. under pressure in the presence of a hydrosilicate of alumina acting as catalyst.

SIEGFRIED SKRAUP.